United States Patent
Midttun et al.

(10) Patent No.: US 7,519,503 B2
(45) Date of Patent: Apr. 14, 2009

(54) DATA HANDLING SYSTEM

(75) Inventors: Mons Midttun, Hjellestad (NO); Jan-Erik Nordvedt, Rådal (NO)

(73) Assignee: Epsis AS, Bergen (NO)

( * ) Notice: Subject to any disclaimer, the term of this patent is extended or adjusted under 35 U.S.C. 154(b) by 89 days.

(21) Appl. No.: 11/708,085

(22) Filed: Feb. 15, 2007

(65) Prior Publication Data

US 2008/0201728 A1   Aug. 21, 2008

(51) Int. Cl.
G06F 17/18   (2006.01)
G06F 19/00   (2006.01)
(52) U.S. Cl. ..................................... 702/179
(58) Field of Classification Search ............... 702/179
See application file for complete search history.

(56) References Cited

U.S. PATENT DOCUMENTS

| | | | | |
|---|---|---|---|---|
| 6,519,568 B1* | 2/2003 | Harvey et al. | ........... | 705/1 |
| 6,961,753 B1* | 11/2005 | Osburn, III | ........... | 709/203 |
| 7,242,317 B2* | 7/2007 | Silvers | ........... | 340/853.3 |
| 2004/0154832 A1* | 8/2004 | Koithan | ........... | 175/26 |
| 2007/0175640 A1* | 8/2007 | Atencio et al. | ........... | 166/369 |
| 2008/0201706 A1* | 8/2008 | Nordtvedt et al. | ........... | 717/177 |

FOREIGN PATENT DOCUMENTS

EP   0001640   2/1979

* cited by examiner

*Primary Examiner*—Michael P. Nghiem
*Assistant Examiner*—Cindy H Khuu
(74) *Attorney, Agent, or Firm*—Abelman, Frayne & Schwab

(57) ABSTRACT

A data handling system for monitoring and/or managing a complex system includes computing hardware operable to execute support software products for assimilating information and/or data from the complex system and for sending information and/or data thereto for monitoring and/or managing the complex system The handling system is provided with interface software products executable on computing hardware for implementing a data interface between personnel and the support software products and/or directly to the complex system. The interface software products implement workflows defined in a top-down strategy. The workflows define data filters and/or aggregators for selectively filtering and/or aggregating information and/or data provided from the complex system and/or from the support software products for presenting to the personnel via the interface software products for selectively reducing a quantity of data to be interpreted by the personnel. The data handling system is especially pertinent to oil/gas exploration and/or production, although not limited thereto.

25 Claims, 8 Drawing Sheets

DATA HANDLING SYSTEM

FIELD OF THE INVENTION

The present invention relates to data handling systems, for example to data handling systems operable to process measurement data acquired from hardware and database data to provide signals indicative of status of the hardware and thereby provide a tool for managing the hardware; optionally, the hardware is a complex configuration of at least one of oil wells, gas wells, wind turbines, solar cells, geothermal sites, aquatic wave energy units and similar. Moreover, the invention also relates to methods of processing measurement data from hardware and database data in such data handling systems to provide signals indicative of hardware status and thereby provide a tool for managing the hardware. Furthermore, the invention also concerns software products executable on computing hardware for implementing such methods and associated data handling systems.

BACKGROUND OF THE INVENTION

Control and optimization of complex systems is a frequently encountered contemporary technical problem. For example, in a European Patent Office appeal decision T26/86 relating to a European patent application EP78101198, an invention pertaining to a control computer coupled to a known type of X-ray tube for controlling operating parameters of the X-ray tube is described. The invention concerns a control computer configured to execute software for rendering the computer operable to control the X-ray tube for achieving an optimum exposure whilst providing adequate protection against overloading the X-ray tube. In the aforesaid decision T26/86, the European Patent Office deemed subject matter claimed in claims of the patent application EP78101198 to be potentially patentable in view of the subject matter being directed towards solving a technical problem and not relating solely to software as such.

Moreover, in a European Patent Office appeal decision T6/83 relating to a European patent application no. EP79101907, another invention is described concerning co-ordination and control of internal communication between programs and data files held at different processors in a data processing system having a plurality of interconnected data processors in a telecommunication network. The invention is not concerned with the nature of data communicated within the data processing system, but rather with coordination of internal basic functions of the data processing system for permitting a plurality of software programs for specific applications to be executed. The invention was deemed by the European Patent Office to be solving a problem which was essentially technical in nature, thereby rendering the claimed invention patentable.

From the foregoing, a principle has evolved that software executable on computing hardware for solving a problem having a technical nature is considered to relate to potentially patentable subject matter.

Software products executable on computing hardware for controlling logistics within complex systems are generally known. Such logistics software products are used, for example, to control movements of containers on maritime cargo ships between various seaports. Alternatively, such software products can be used to control movements of vehicles distributing goods over a geographical area, wherein operational problems can arise such as breakdown of the vehicles, traffic accidents delaying movements of the vehicles, adverse weather conditions and so forth. The software products are capable of dynamically adapting to problematic situations arising in systems for which they are configured to control and manage.

A problem arises when proprietary software products have been incrementally brought into use to monitor and control extremely complex systems. For example, an oil and/or gas field indicated generally by 10 in FIG. 1 comprises many thousands of oil and/or gas wells from which oil and/or gas is substantially continuously extracted; an example oil and/or gas well is denoted by 20. For example, the oil field 10 includes in an order of eleven thousand oil and/or gas wells. Oil and/or gas extraction and handling equipment 30 associated with each of the oil and/or gas wells 20 is prone to exhibiting imperfect reliability, namely occasionally subject to breakdowns and thereby requiring maintenance. Moreover, physical conditions such as well-pressure can be dynamically varying in each of the oil and/or gas wells 20, thereby affecting a yield of oil and/or gas obtainable therefrom. A control centre 50 including computing hardware 60 operable to execute software products is coupled in communication with arrays of sensors 40 included in the extraction and handling equipment 30 of the wells 20 of the oil and/or gas field 10. The control centre 50 is operated by a group of personnel denoted by 70, the group 70 employing the computing hardware 60 to monitor and manage operation of the oil and/or gas wells 20 by way of signals supplied from the arrays of sensors 40 to the computing hardware 60.

The computing hardware 60 itself is illustrated schematically in FIG. 2. The computing hardware 60 comprises, for example, data memory 90 for storing a plurality of databases 100 and computers 110 with one or more associated display monitors 120. The one or more display monitors 120 are spatially disposed to be viewed by the group of personnel 70. The computers 110 are operable to receive the aforesaid signals and store data derived therefrom in the databases 100. Moreover, the computers 110 are operable, under control of the aforementioned software products, to selectively extract data from the databases 110 and/or the aforesaid signals from the arrays of sensors 40 for visually presenting various categories of information to the group of personnel 70.

A technical problem which is encountered in practice in the control centre 50 is that the group of personnel 70 are often overwhelmed by an huge volume of data from the arrays of sensors 40 such that it is difficult for the group of personnel 70 to derive a clear overall indication of functioning of the oil and/or gas field 10 quickly for making decisions. For example, data stored in the databases 100 is often not cross-related on account of an incremental manner in which the software products executing on the computing hardware 60 have been brought into operation during development of the oil and/or gas field 10. Moreover, a further problem arises in that the software products are often from more than one vendor and are thereby not designed to mutually interoperate.

A further issue is that the group of personnel 70 are subject to human characteristics such as impatience and limited concentration time span which renders it difficult for them to handle a vast amount of information being presented to them by the computing hardware 60. The group of personnel 70 can optionally simply chose to ignore certain information presented to them but then risk overlooking important issues which prevent the oil and/or gas field 10 from being operated in an efficient manner, for example the group of personnel 70 miss an opportunity to extract greater quantities of oil from certain oil and/or gas wells 20 exhibiting unusually high well pressures by ignoring pressure measurement data pertaining to the certain oil and/or gas wells 20.

Thus, a conventional approach to addressing the technical problem as described in the foregoing is to execute several contemporary proprietary software products on the computing hardware 60 to process measurement data derived from the oil and/or gas field 10 to generate several diverse sets of processed measurement output data, and to rely on the group of personnel 70 to manually correlate the sets of output data to extract pertinent information therefrom for managing operation of the oil and/or gas field 10.

Although the technical problem addressed by the present invention has been elucidated in the foregoing, for example in relation to the oil and/or gas field 10, it will be appreciated that similar technical problems arise when controlling other types of complex systems, for example control systems including one or more of solar cell arrays, wind farms comprising arrays of wind turbines, arrays of coastal wave energy collectors, arrays of geothermal bore holes and so forth.

SUMMARY OF THE INVENTION

A first object of the invention is to provide a data handling system which is operable to manage a complex array of hardware, for example an oil and/or gas field comprising a plurality of oil and/or gas wells although not limited thereto, already provided with associated computing hardware operable to execute one or more already installed software products, and/or one or more subsequently installed software products, for collecting data from the complex array of hardware and for managing the complex array of hardware.

A second object of the invention is to provide a software product executable on computing hardware for interoperating with one or more already installed software products, and/or one or more subsequently installed software products, for collecting data from a complex array of hardware, for example an oil and/or gas field comprising a plurality of oil and/or gas wells although not limited thereto, and for managing the complex array of hardware.

A third object of the invention is to provide a method of interoperating with one or more already installed software products, and/or one or more subsequently installed software products, executable on computing hardware for collecting data from a complex array of hardware, for example an oil and/or gas field comprising a plurality of oil and/or gas wells although not limited thereto, and for managing the complex array of hardware.

One or more of these objects of the invention are capable of being addressed by the present invention as defined by the appended claims.

According to a first aspect of the invention, there is provided a data handling system for managing and/or monitoring a complex system, the data handling system comprising computing hardware operable to execute one or more support software products for assimilating data and/or information from the complex system and for sending information and/or data thereto for monitoring and/or managing the complex system, characterized in that the data handling system is further provided with one or more interface software products executable on the computing hardware for providing in operation a data and/or information interface between one or more personnel and at least one of: the one or more support software products, directly to the complex system, the one or more interface software products being operable to implement one or more workflows defined in a top-down strategy, the one or more workflows defining one or more data filters for selectively filtering and/or aggregating information and/or data provided from the complex system and/or from the one or more support software products for presenting to the one or more personnel via the one or more interface software products for selectively reducing a quantity of data and/or information to be interpreted by the one or more personnel.

The invention is of advantage in that use of workflows and associated selective filtering of information is capable of reducing an amount of data that the one or more personnel are required to interpret in operation for monitoring and/or managing the complex system.

In the foregoing, "data filtering" is to be construed, for example, to mean making a selection of a subset of data and/or information from a set of data and/or information; for example, a set of data corresponds to oil and/or gas well pressures of all oil and/or gas wells in an oil and/or gas field, and a filtered subset thereof corresponds to oil and/or gas well pressures of oil and/or gas wells producing 80% of total oil and/or gas from the oil and/or gas field. Moreover, in the foregoing, "data aggregation" corresponds to a selection of data from more than one data set; for example, a data aggregate corresponds to a collection of data including 3-D views of oil and/or gas wells producing most oil and/or gas from an oil and/or gas field together with their operating procedures together with 3-D layered views of geological structures beneath the oil and/or gas wells producing most oil and/or gas; optionally, the 3-D layered views of geological structures can be computed prior to such aggregation, for example stored in a database for reference. Similar considerations pertain *mutatis mutandis* to information pertaining to the oil and/or gas field. It will be appreciated that such data and/or information filtering as well as such data and/or information aggregation can potentially be implemented in numerous different ways as directed using the one or more interface software products pursuant to the present invention. "Monitoring" is to be construed to include functions of measurement gathering, sensing and associated data communication and data conditioning for presentation. "Managing" is to be construed to include directing and controlling at a higher cognitive level than simple feedback control, although not excluding simpler feedback control as a part of such managing when appropriate.

As will be elucidated later, filtering and/or aggregating of data and/or information is executed in the present invention as defined by one or more workflows, or steps included in such workflows. Such filtering is capable to selectively presenting the one or more personnel with an optimal amount of information to avoid stressing such personnel. Moreover, data aggregation is susceptible to combining information from diverse sources as defined by one or more workflows, so that pertinent data and/or information are presented in combination to the one or more personnel at an appropriate opportunity without the one or more personnel needing to use time searching for the data and/or information in amongst complex databases and such like.

Optionally, in the data handling system, the one or more interface software products are provided when executing on the computing hardware with access to at least one dedicated database, the at least one dedicated database being used by the one or more interface software products to store data supplied by the one or more support software products subject to data filtering and/or aggregating as defined by the one or more workflows. Use of the dedicated database is capable of improving responsiveness of the data handling system when presenting results and related information to the one or more personnel.

Optionally, in the data handling system, the one or more interface software products are operable to communicate presentation data to an array of one or more screens viewable by the one or more personnel in operation, the presentation data being derived from at least one of:

(a) intermediate data and/or information computed by the one or more support data products from measurement data provided from the complex system;

(b) measurement data supplied directly from the complex system to the one or more interface software products; and (c) selectively-filtered and/or selectively-aggregated stored data which has been generated by the one or more interface software products in operation from data provided from the one or more supportive data products and/or directly from the complex system.

Optionally, in the data handling system, the one or more interface software products when executed on the computing hardware are operable to enable the one or more personnel to define one or more workflows in a top-down strategy, the one or more workflows defining one or more filter parameters for use in filtering and/or aggregating data and/or information to be presented to the one or more personnel in operation. Use of a top-down strategy for devising the workflows is capable of specifically identifying data which is relevant to the workflows for avoiding the one or more personnel being presented with irrelevant information to interpret in potentially stressful situations.

Optionally, in the data handling system, the one or more interface software products are operable when executed on the computing hardware to render the one or more workflows to be invoked in response to at least one of:

(a) one or more invoking instructions generated from one or more other workflows;

(b) one or more physical conditions arising within the complex system; and (c) one or more instructions entered by the one or more personnel to the computer hardware via the one or more interfacing software products.

Such automatic or semi-automatic invoking of workflows potentially reduces a workload of monitoring processes undertaken by the one or more personnel in operation. Conveniently, when one or more workflows are automatically or semi-automatically invoked, the data handling system is said to be "event driven".

Optionally, in the data handling system, the one or more interface software products are operable to enable the one or more workflows to be configured in a mutually-dependent hierarchical manner. Optionally, such a mutually-dependent hierarchical manner of workflow arrangement can be an "event driven" and/or "work flow driven" construction. Such hierarchical dependence is necessary when managing convoluted processes occurring in the complex system, especially processes susceptible to exhibiting many potentially complex operating states; such states can, for example, correspond to high production, medium production, low production and emergency states.

Optionally, in the data handling system, the one or more interface software products are operable to enable the one or more workflows to be configured to be executed in a mutually concurrent manner. In the complex system, many processes are potentially occurring concurrently which need to be monitored and managed. The one or more interface software products when executed on the computing hardware are capable of coping with monitoring and assisting in managing such numerous parallel processes as represented by mutually parallel workflows.

Optionally, in the data handling system, the array of one or more screens includes a plurality of screens and/or display regions comprising:

(a) a first screen or first display region for presenting a spatial representation of the complex system;

(b) a second screen or second display region for presenting one or more workflows facilitated by the one or more interface software products;

(c) a third screen or third display region for presenting filtered data which is pertinent to the one or more workflows facilitated by the one or more interface software products;

(d) a fourth screen or display region for presenting a one or more operating procedures relevant to the one or more workflows presented on the second screen.

Such a configuration of screens is found to function ergonomically favourably when implementing the present invention for a group of personnel, namely for generating a working environment exhibiting reduced operating stress level. More optionally, the first screen or display region is spatially located centrally relative to the second, third and fourth screens or display regions.

Optionally, in the data handling system, the one or more interface software products include a data integration service software product for defining a data interface between the one or more interface software products and the one or more support software products, the one or more data interface software products being operable to function as a data filter and/or data aggregator for reducing a volume of data to be presented to the one or more personnel in connection with one or more associated workflows being presented thereto. An information filter is thereby provided which is capable of reducing a volume of information needed to be presented to the one or more personnel for monitoring and/or managing the complex system.

More optionally, to enhance usefulness of the data handling system, the data integration service software product is operable to being edited to adapt the one or more interface software products for operating with a variety of types of the complex system. Yet more optionally, the data handling system is configurable by way of the one or more interface software products for being used to monitor and/or manage the complex system when the complex system is implemented as at least one of:

(a) a configuration of oil and/or gas wells;

(b) a configuration of off-shore oil and/or gas platforms;

(c) a configuration of wind turbines operable to generate electricity;

(d) a configuration of solar cells operable to generate electricity;

(e) a nuclear electrical power generating installation;

(f) an electricity distribution network;

(g) a configuration of marine wave energy units operable to generate electricity from marine wave motion;

(i) a configuration of dams and/or sluices;

(j) a convention fossil-fuel burning electricity generating facility;

(k) a configuration of coal mines for mining coal;

(l) a configuration of geothermal sites for collecting geothermal energy;

(m) a logistics configuration for distributing goods.

Such configurations for the complex system are susceptible to behaving in complex and convoluted manners which are potentially stressful for one or more personnel to monitor and/or manage. The present invention is susceptible to render such monitoring and/or management easier to implement.

According to a second aspect of the invention, there is provided a software product stored or communicated via a data carrier, the software product being executable on computing hardware for implementing a data handling system pursuant to the first aspect of the invention.

According to a third aspect of the invention, there is provided a method of handling data in a data handling system for monitoring and/or managing a complex system, the data handling system comprising computing hardware operable to execute one or more support software products for assimilating information and/or data from the complex system and for sending control information thereto for monitoring and/or managing the complex system,
characterized in that
the method includes steps of:
(a) installing into the data handling system one or more interface software products executable on the computing hardware for providing in operation a data interface between one or more personnel and at least one of: the one or more support software products, directly to the complex system;
(b) applying the one or more interface software products to implement one or more workflows defined in a top-down strategy, the one or more workflows defining one or more filters and/or aggregators for selectively filtering and/or aggregating information and/or data provided from the complex system and/or from the one or more support software products for presenting to the one or more personnel via the one or more interface software products for selectively reducing a quantity of data to be interpreted by the one or more personnel.

As elucidated in the foregoing, "data filtering" is to be construed, for example, to mean making a selection of a subset of data and/or information from a set of data and/or information; for example, a set of data corresponds to oil and/or gas well pressures of all oil and/or gas wells in an oil and/or gas field, and a filtered subset thereof corresponds to oil and/or gas well pressures of oil and/or gas wells producing 80% of total oil and/or gas from the oil and/or gas field. Moreover, in the foregoing, "data aggregation" corresponds to a selection of data from more than one data set; for example, a data aggregate corresponds to a collection of data including 3-D views of oil and/or gas wells producing most oil and/or gas from an oil and/or gas field together with their operating procedures together with 3-D layered views of geological structures beneath the oil and/or gas wells producing most oil and/or gas. Similar considerations pertain mutatis mutandis to information pertaining to the oil and/or gas field. It will be appreciated that such data and/or information filtering as well as such data and/or information aggregation can potentially be implemented in numerous different ways as directed using the one or more interface software products pursuant to the present invention. "Monitoring" is to be construed to include functions of measurement gathering, sensing and associated data communication and data conditioning for presentation. "Managing" is to be construed to include directing and controlling at a higher cognitive level than simple feedback control, although not excluding simpler feedback control as a part of such managing when appropriate.

As will be elucidated later, filtering and/or aggregating of data and/or information is executed in the present invention as defined by one or more workflows, or steps included in such workflows. Such filtering is capable to selectively presenting the one or more personnel with an optimal amount of information to avoid stressing such personnel. Moreover, data aggregation is susceptible to combining information from diverse sources as defined by one or more workflows, so that pertinent data and/or information are presented in combination to the one or more personnel at an appropriate opportunity without the one or more personnel needing to use time searching for the data and/or information in amongst complex databases and such like.

Optionally, the method includes a step of:
(c) providing the one or more interface software products when executing on the computing hardware with access to one or more dedicated databases, the one or more dedicated databases being used by the one or more interface software products to store data supplied by the one or more support software products subject to data and/or information filtering and/or aggregating as defined by the one or more workflows.

Optionally, the method includes a further step of:
(d) communicating via the one or more interface software products presentation data to an array of one or more screens viewable by the one or more personnel in operation, the presentation data being derived from at least one of:
intermediate data computed by the one or more support data products from measurement data provided from the complex system;
measurement data supplied directly from the complex system to the one or more interface software products; and
selectively-filtered and/or selectively-aggregating stored data which has been generated by the one or more interface software products in operation from data and/or information provided from the one or more supportive data products and/or directly from the complex system.

Optionally, the method includes a step of:
(e) enabling the one or more interface software products when executed on the computing hardware for the one or more personnel to define one or more workflows in a top-down strategy, the one or more workflows defining one or more filter parameters and/or aggregating parameters for use in filtering and/or aggregating data and/or information to be presented to the one or more personnel in operation.

Optionally, the method includes a step of:
(f) configuring the one or more interface software products to be operable to render the one or more workflows to be invoked in response to at least one of:
one or more invoking instructions generated from one or more other workflows;
one or more physical conditions arising within the complex system; and
one or more instructions entered by the one or more personnel to the computer hardware via the one or more interfacing software products.

Optionally, the method includes a step of:
(g) arranging the one or more interface software products to be operable to enable the one or more workflows to be configured in a mutually-dependent hierarchical manner.

Optionally, the method includes a step of:
(h) arranging the one or more interface software products to be operable to enable the one or more workflows to be configured to be executed in a mutually concurrent manner.

More optionally, when implementing the method, the array of one or more screens includes a plurality of screens and/or a plurality of screen regions comprising:
(a) a first screen or first screen region for presenting a spatial representation of the complex system;
(b) a second screen or second screen region for presenting one or more workflows facilitated by the one or more interface software products;
(c) a third screen or third screen region for presenting filtered data which is pertinent to the one or more workflows facilitated by the one or more interface software products;

(d) a fourth screen or fourth screen region for presenting one or more operating procedures relevant to the one or more workflows presented on the second screen or second screen region.

Optionally, when implementing the method, the first screen or first screen region is spatially located centrally relative to the second, third and fourth screens or screen regions.

Optionally, when implementing the method, the one or more interface software products include a data integration service software product for defining a data interface between the one or more interface software products and the one or more support software products, the data interface software product being operable to function as a data filter and/or data aggregator for reducing a volume of data to be presented to the one or more personnel in connection with one or more associated workflows being presented thereto.

More optionally, when implementing the method, the data integration service software product is operable to being edited to adapt the one or more interface software products for operating with a variety of types of the complex system. Yet more optionally, in respect of the method, the one or more interface software products are configurable for being used to monitor and/or control the complex system when the complex system is implemented as at least one of:

(a) a configuration of oil and/or gas wells;
(b) a configuration of off-shore oil and/or gas platforms;
(c) a configuration of wind turbines operable to generate electricity;
(d) a configuration of solar cells for operable to generate electricity;
(e) a nuclear electrical power generating installation;
(f) an electricity distribution network;
(g) a configuration of marine wave energy units operable to generate electricity from marine wave motion;
(i) a configuration of dams and/or sluices;
(j) a convention fossil-fuel burning electricity generating facility;
(k) a configuration of coal mines for mining coal;
(l) a configuration of geothermal sites for collecting geothermal energy;
(m) a logistics configuration for distributing goods.

It will be appreciated that features of the invention are susceptible to being combined in any combination with departing from the scope of the invention as defined by the appended claims.

BRIEF DESCRIPTION OF THE DRAWINGS

Embodiments of the invention will now be described, by way of example only, with reference to the following diagrams wherein.

In the accompanying diagrams, a number accompanied by an associated arrow is used to generally indicate a given item. Moreover, an underlined number is employed to denote an item onto which it is overlaid. A number associated with a connecting line is used to denote an item at which an end of the connecting line remote from the number terminates.

DESCRIPTION OF EMBODIMENTS OF THE INVENTION

In overview, the present invention is concerned with a data handling system for use in managing complex systems, for example complex arrays of hardware; such arrays of hardware are, for example:

(a) an array of oil and/or gas wells included in an oil and/or gas field;
(b) an array of wind turbines in a wind farm;
(c) an array of wave-power electricity generators;
(d) a distributed array of steerable solar cells;
(e) nuclear power plant facilities;

to mention a few examples.

In contemporary implementations, such complex systems are provided with sensors distributed therearound for sensing various operating parameters of the systems, the sensors providing measuring signals which are conveyed, for example by telemetry, to control centres associated with the systems. Such control centres in contemporary implementation each includes one or more computers for receiving the measurement signals from their associated sensors. The one or more computers are configured to execute one or more software products which are operable when executed to cause the one or more computers to perform various functions such as:

(f) receiving the measurement signals, processing the measurements signals for storage in computer memory, for presentation or for use as feedback for managing the associated complex system;

(g) receiving instructions from a group of personnel comprising one or more persons, such instructions for directing operation of the complex system;

(h) providing a communication link to personnel who are working in amongst the complex system, for example field personnel.

It often occurs in contemporary practice that the software products executable on the one or more computers at the control centre are diverse proprietary software products which have been coupled together to enable the control centre to function. It is potentially highly uneconomical to develop software products specifically customized to each complex system. Moreover, software support for a wide range of customized software products represents an expensive solution. Moreover, the use of contemporary software products tends to result in the group of personnel at the control centre being overwhelmed with data so that they are unable to respond in an optimal manner. Moreover, many contemporary software products are unable to provide sufficiently rapid data processing for real-time presentation to the group of personnel on account of a volume of measurement data provided from the complex system to be processed.

Figure 1:
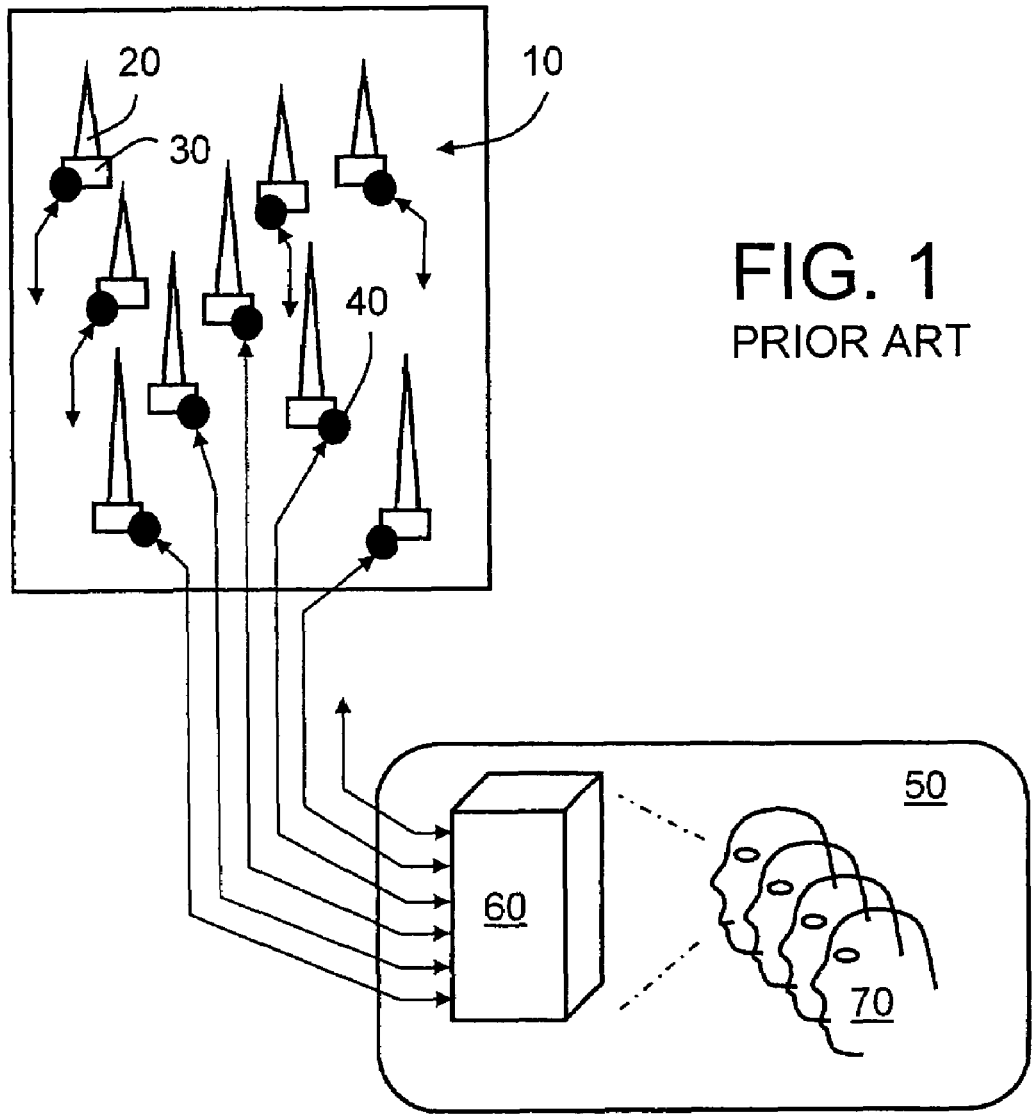
FIG. 1 is a schematic illustration of an oil and/or gas field including an array of oil and/or gas wells monitored and managed from a contemporary control centre coupled in communication with the array of oil and/or gas wells.

In overview, the present invention is capable of addressing such technical problems by providing one or more interfacing software products which enable management and associated measurement signal information gathering from the complex system to be implemented in a "top-down" manner in contradistinction to a conventional "bottom-up" approach as depicted in FIG. 1 of configuring contemporary software products to work in cooperation to process measurement signals and present corresponding information to the group of personnel. By adopting such a novel "top-down" approach, the group of personnel are able to define in a "top-down" manner a series of processes (P) to occur in the complex system, together with:

(i) defining associated information to be extracted in a manner of a data filter and/or data aggregator from the measurement signals for generate filtered and/or aggregated information for supporting execution of the series of processes (P);

(ii) defining a manner in which the filtered and/or aggregated information is to be visually and/or aurally presented to the group of personnel;

(iii) defining subsidiary data to be extracted from a data base at the control centre to be associated with the filtered information, for example by way of data aggregation; and (iv) defining how the filtered information is to be used as automatic or semiautomatic feedback for managing operation of the complex system.

An importance of points (i) to (iv) in the foregoing will be appreciated in the context of well-known Chernobyl and Three Mile Island nuclear reactor incidents in Russia and United States of America respectively. In each of these incidents, a group of personnel responsible for controlling their respective nuclear reactors were allegedly not provided with sufficiently clear information quickly enough to appreciate technical processes which were occurring in their respective reactors. Consequently, actions to shut down their respective reactors were not executed sufficiently rapidly to avert an occurrence of operating problems. The present invention is capable of addressing such operating problems. In the context of oil and/or gas fields, equipment breakdown can occur as well as exceptional oil and/or gas field pressures can be encountered requiring rapid attention.

The invention will now be further elucidated by describing embodiments of the invention.

Figure 3:
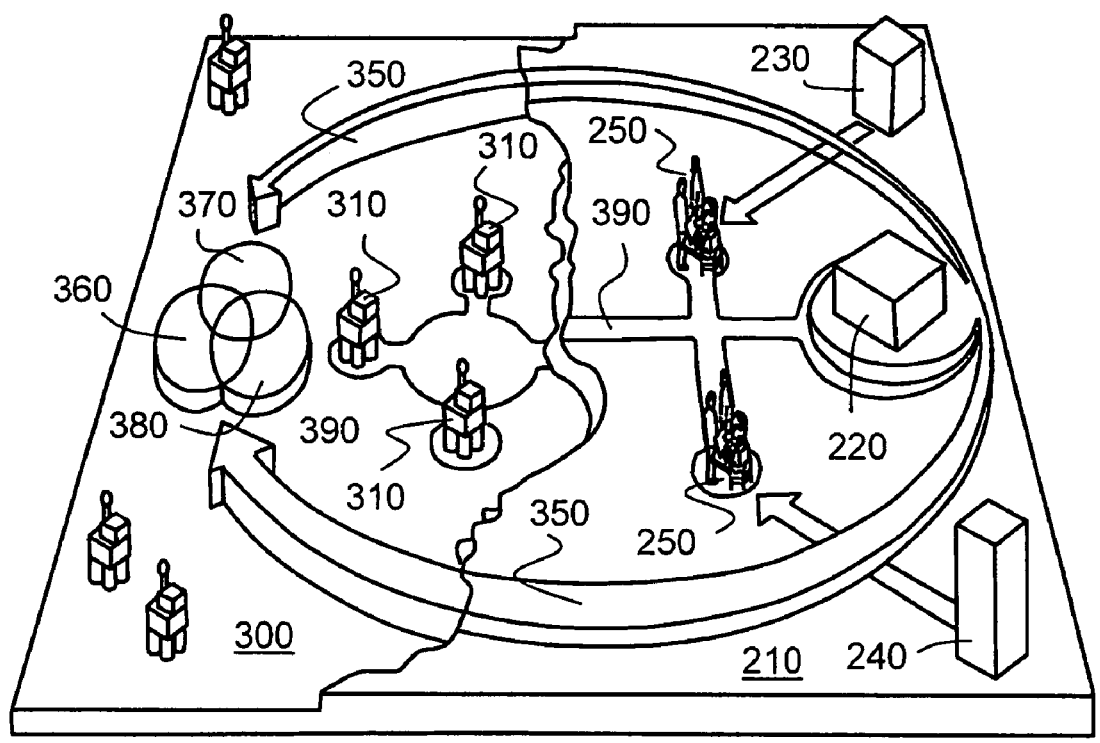
FIG. 3 is a schematic illustration of an integrated operation representing a manner of working in an oil and/or gas industry pertinent to the present invention.

In FIG. 3, there is shown an illustrative representation of an integrated operation pertinent for oil and/or gas industries. The integrated operation is indicated generally by 200 and comprises a land area 210 including an operation centre 220, vendor offices 230, company offices 240, and specialist resources 250. Moreover, the integrated operation 200 further comprises an off-shore marine area 300 including a plurality of off-shore oil and/or gas platforms 310. The integrated operation 200 constitutes a complex system for exploration and production of oil and/or gas which requires management and coordination of many contributing components as denoted by encircling arrows 350. In order for the integrated operation 200 to function, a complex interaction of technology denoted by 360, persons denoted by 370 and processes denoted by 380 occurs in operation. As denoted by 390, the operation centre 220, the vendor offices 230, the company offices 240, the specialist resources 250 and the oil and/or gas platforms 310 are all mutually connected in a complex manner so that the integrated operation 200 is capable of functioning. Moreover, functioning of the integrated operation 200 involves complex interactions between certain personnel with other personnel, and personnel with technical equipment. The integrated operation 200 is directed from the operation centre 220 pursuant to general directives communicated to the operation centre 220 from the company offices 240, for example expected production yields, oil and/or gas extraction rates required and so forth.

The oil and/or gas platforms 310 are equipped with a vast array of sensors, for example temperature sensors, fluid flow sensors, drill-bit rotation rate sensors, chemical sensors, seismic sensors, strain gauge sensors, to mention a few examples. Signals from the sensors are relayed by telemetry via local data processing provided at the oil and/or gas platforms 310 back to the operation centre 220. In consequence, the operation centre 220 is provided with a vast spectrum of data. An operational problem which the present invention seeks to address is to provide a method of handling the vast spectrum of data provided to the operation centre 220 in combination with, for example, inputs from the specialist resources 250, inputs from the vendor offices 230, and guideline instructions from the company offices 240.

Figure 4:
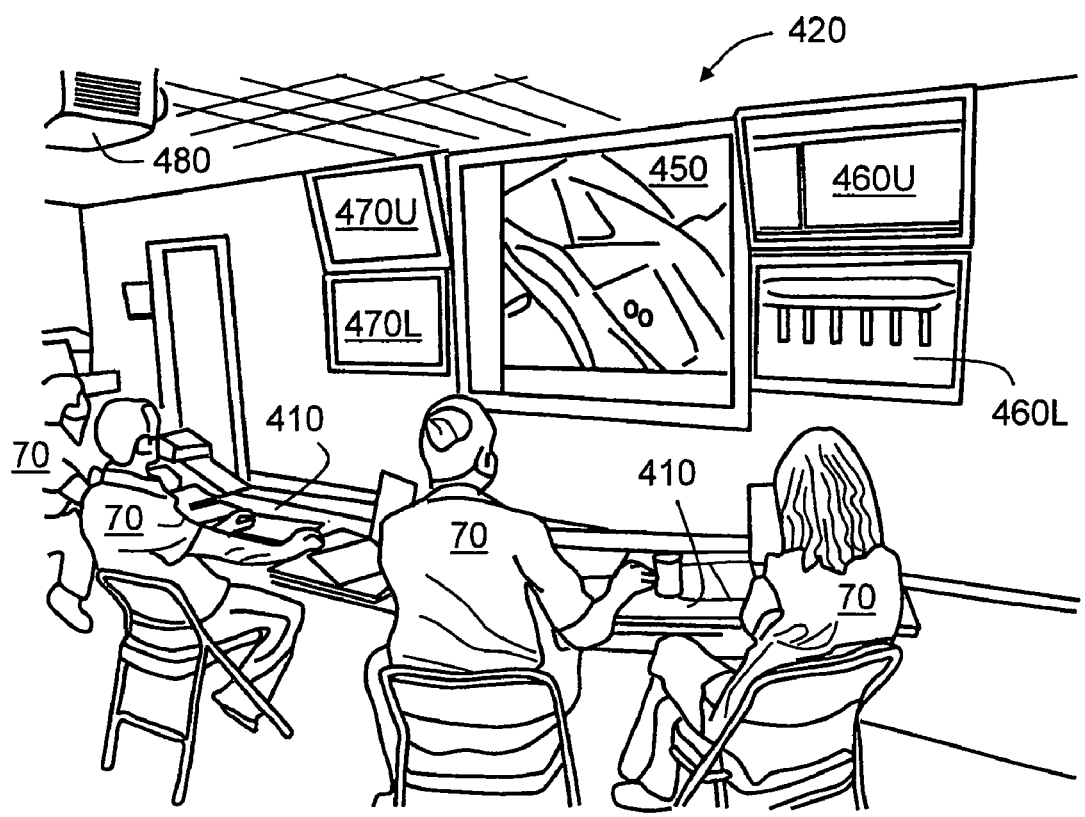
FIG. 4 is an environment created by the present invention for a group of personnel monitoring and controlling the integrated operation of FIG. 3.

Referring next to FIG. 4, the present invention provides an environment indicated generally by 400 which is more conducive for the group of personnel 70 to receive messages and information indicative of the state of the off-shore oil and/or gas platforms 310; the off-shore oil and/or gas platforms 310 can be considered generally equivalent to the oil and/or gas field 10 shown in FIG. 1. The environment 400 illustrated includes the group of personnel 70 seated at a console 410 or similar desk arrangement disposed to view an array of one or more display screens indicated generally by 420. In one embodiment of the invention, the array 420 comprises a single extensive screen in which one or more sub-areas or sub-regions thereof can be selectively allocated to present specific types of associated information; the sub-areas or sub-regions are beneficially definable under software control, for example in response to mouse control or cursor control at the console 410. In another embodiment of the invention, the array of screens 420 includes a relatively larger central screen 450, right-hand-side (RHS) upper and lower screens 460U, 460L respectively, and left-hand-side (LHS) upper and lower screens 470U, 470L respectively. Optionally, in one example embodiment of the present invention, the central screen 420 is implemented by using a screen projector 480, for example implemented as a liquid crystal display or actuated micromirror array projection unit. The right-hand-side screens 460U, 460L and the left-hand-side screens 470U, 470L are optionally in the example embodiment implemented as panel plasma display screens or panel liquid display screens. The screens 420, 460U, 460L, 470U, 470L are beneficially disposed in an arrangement as illustrated in FIG. 4, although other arrangements for the screens are within the scope of the present invention. Such an arrangement of screens as shown in FIG. 4 has been devised by the inventors to provide an ergonomically satisfactory presentation for the group of personnel 70. Moreover, the screens 420, 460U, 460L, 470U, 470L are beneficially operable to present certain specific categories of information as will be described in greater detail later.

Figure 5:
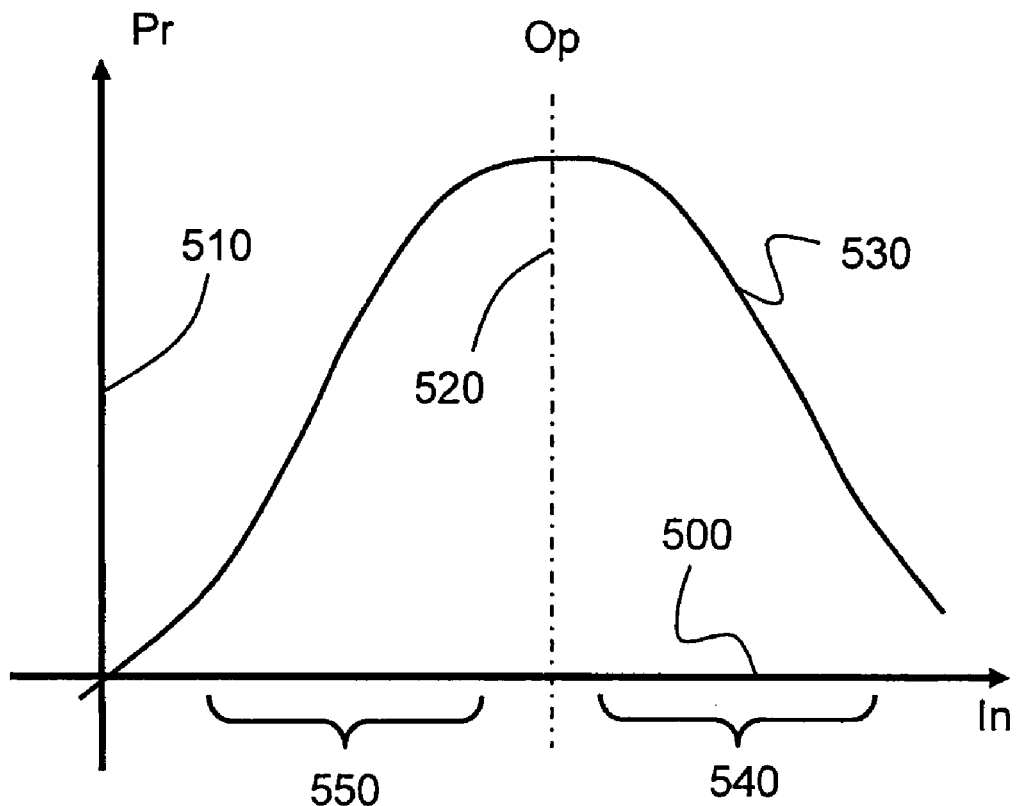
FIG. 5 is a qualitative graph illustrating performance of the group of personnel in FIG. 3 under various working conditions.

Referring to FIG. 5, there is shown a graph including an abscissa axis 500 denoting inspiration or personal motivation (In) of the group of personnel 70, and an ordinate axis 620 representing operating performance (Pr) of the group 70. There is also shown a vertical line 520 parallel to the ordinate axis 510 denoting a condition of optimal performance of the group 70. Moreover, a curve 530, at least in qualitative measure, denotes a performance achievable by the group 70. A first region denoted by 540 to a right-hand-side of the vertical line 520 corresponds to a situation wherein the group 70 is provided with excess information, for example by being unsustainably over-motivated, resulting in a stressful situation and hence, over a period of time, sub-optimal performance in terms of monitoring and managing the integrated operation 200. Conversely, a second region denoted by 550 to a left-hand-side of the vertical line 520 corresponds to a situation wherein the group 70 is not provided with sufficient information, for example by being poorly motivated or inattentive, such that decisions in monitoring and managing the integrated operation 200 are not fully considered resulting also in sub-optimal performance of the group 70. A compromise between the first and second regions 540, 550 represents an optimal performance which the present invention seeks to provide and maintain when generating the environment 400 as illustrated in FIG. 4. In achieving the aforesaid optimal performance, the inventors have appreciated in devising the present invention that the group 70 needs to be provided with an optimal amount of information for any given process being monitored and/or managed.

Figure 6:
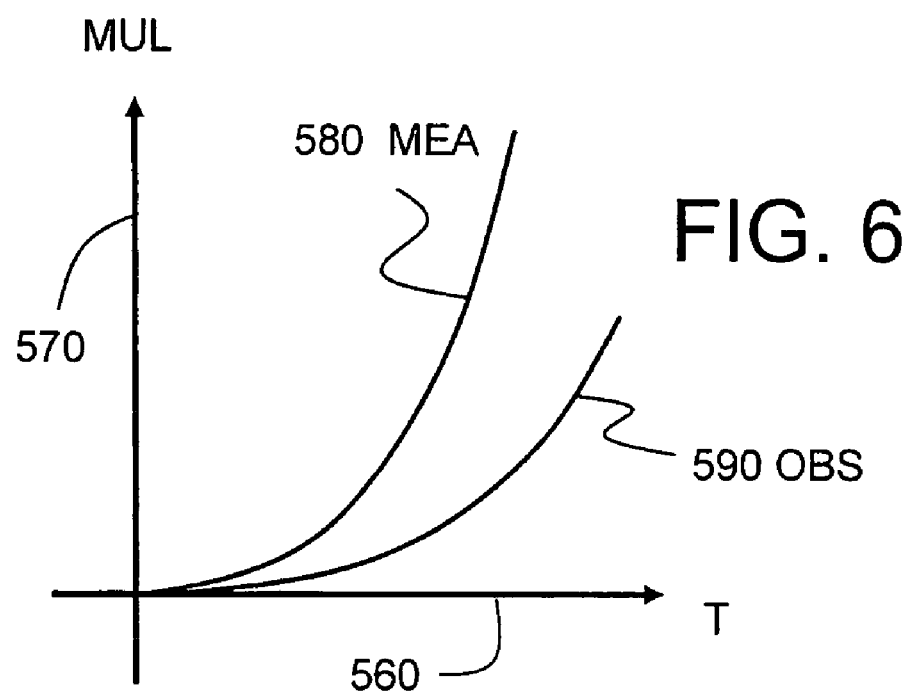
FIG. 6 is a qualitative graph indicating a relationship between number of measurements from the integrated operation which are potentially obtainable in comparison to a quantity of measurements needed for optimally managing and monitoring the integrated operation of FIG. 3.

Referring next to FIG. 6, there is shown a graph comprising an abscissa axis 560 denoting time (T) from left to right, and an ordinate axis 570 defining possibilities or opportunities (MUL) provided to the group 70 for monitoring and managing the integrated operation 200; the possibilities or opportunities increase from bottom to top along the ordinate axis 570. A first curve 580 (MEA) denotes a cumulative number of measurements which are potentially susceptible to being collated with time from the integrated operation 200 to the operation centre 220 whereat the group 70 is located. Moreover, a second curve 590 (OBS) denotes an optimal cumulative number of observed measurements needed for optimally monitoring and managing the integrated operation 200. It will be appreciated from FIG. 6 that a degree of selective filtering of measurement data provided from the integrated operation 200 is needed for the group 70 to be able, in view of their human limitations such as concentration and attention span, to optimally monitor and manage the integrated operation 200. Generation of a filter for providing such selective filtering of measurement data is a complex task when the integrated operation 200 is highly convoluted in nature. The present invention provides an approach to realizing such a filter.

Figure 7:
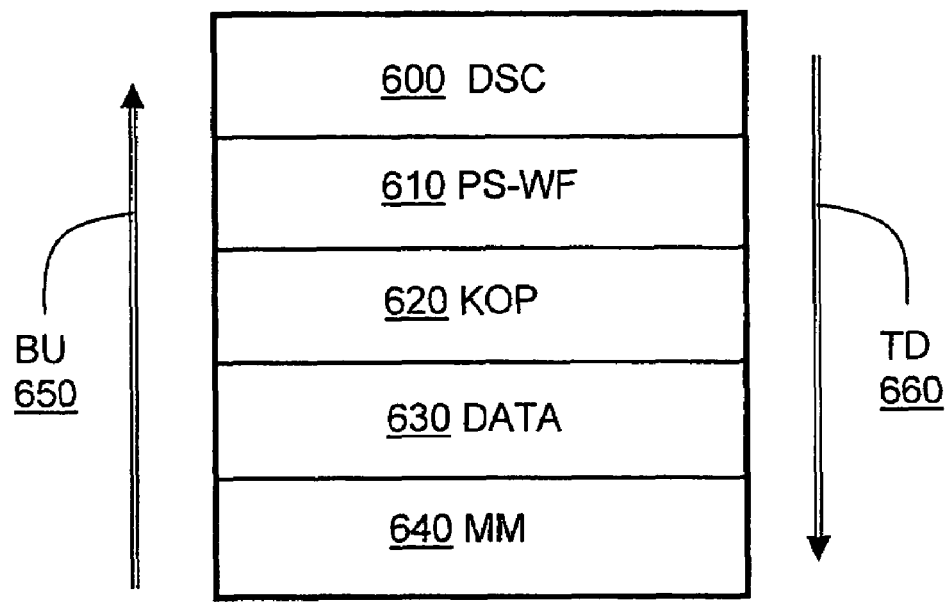
FIG. 7 is an illustration of bottom-up processing of information generated by the integrated operation of FIG. 3 pursuant to known contemporary practice, and also top-down processing of such information as utilized pursuant to the present invention.

The inventors of the present invention have appreciated that understanding and definition of processes and associated work-flow within the integrated operation 200 is of prime importance. Referring to FIG. 7, there is shown a hierarchy of steps as defined in Table 1.

TABLE 1 hierarchy of steps in FIG. 7

| Reference no. | Mnemonic abbreviation | Definition |
|---|---|---|
| 600 | DSC | Discussion, for example within the group of personnel 70 during functioning of the integrated operation 200 |
| 610 | PS-WF | Process steps and work flow |
| 620 | KOP | Knowledge of processes; knowledge of workflows |
| 630 | DATA | Data for presentation to the group of personnel 70 |
| 640 | MM | Measurement model |

Figure 2:
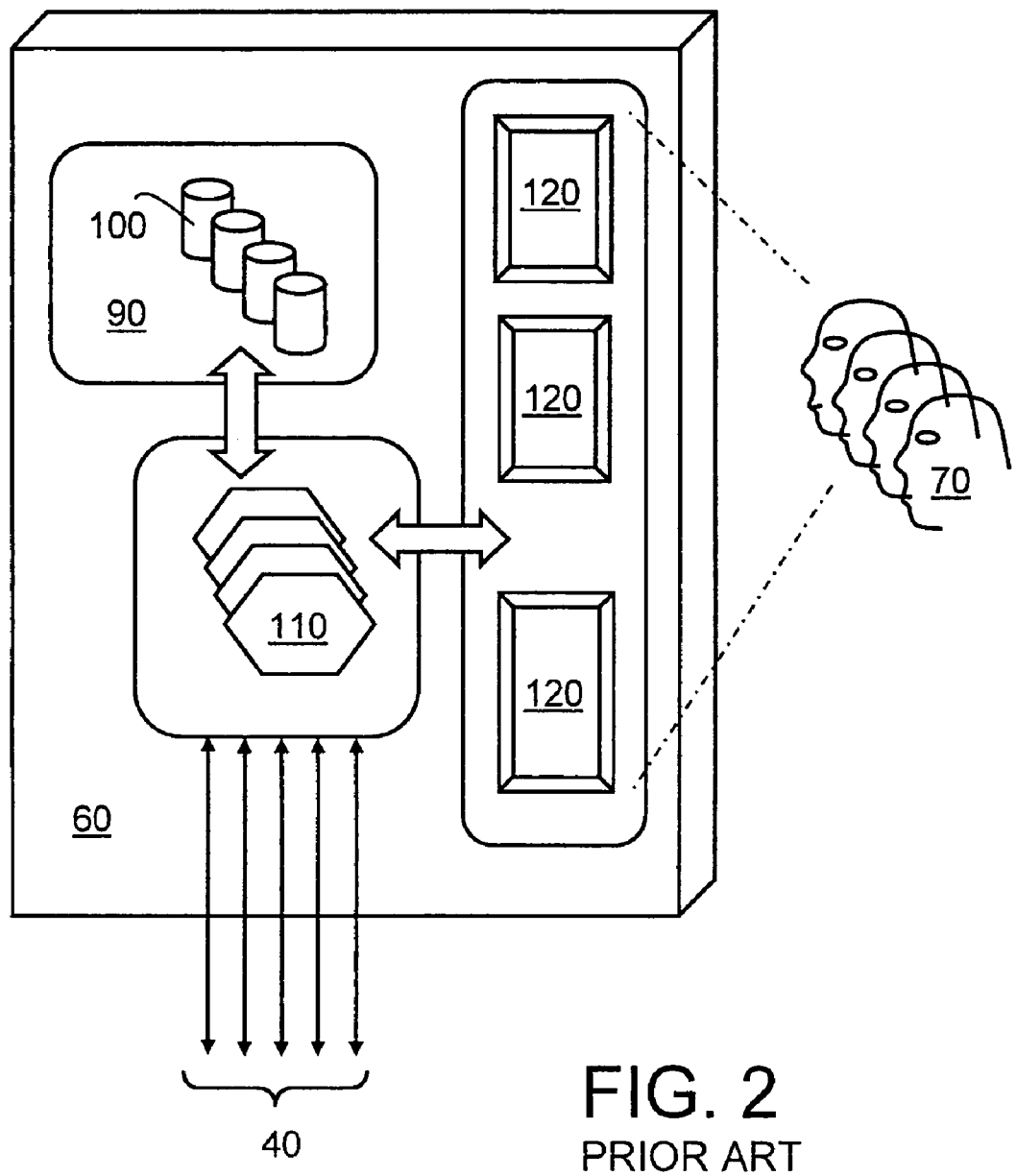
FIG. 2 is a schematic illustration of computing hardware included within the contemporary control centre shown in FIG. 1, the computing hardware being operable to execute software products for receiving signals obtained from the oil and/or gas wells included in the oil and/or gas field and processing such signals to generate information indicative of operation of the oil and/or gas wells, and for generating and conveying control signals to be communicated back to the oil and/or gas wells for controlling their operation.

A conventional hitherto employed approach to monitoring and managing the integrated operation 200 corresponds to a bottom-up (BU) approach as denoted by an arrow 650 and described in the foregoing with reference to FIGS. 1 and 2. In such a conventional approach, measurements are collated from the integrated operation 200 in the step 640 (MM) and then processed in a standard manner to provide data 630 (DATA) for presentation to the group of personnel 70. Some portions of this data 640 (DATA) are relevant for managing the integrated operation 200 at any given instance of time whereas other portions of the data 640 (DATA) are irrelevant, or potentially confusing; sorting out irrelevant from relevant data at the given instance of time is susceptible to causing the group 70 to function in the stressful region 540 illustrated in FIG. 5. By knowledge 620 of processes (KOP), namely workflows, occurring within the integrated operation 200, for example personal experience of certain personnel in the group 70, it is possible to interpret the data 630 (DATA) to identify which process step in a work flow as denoted by 610 (PS-WF) has been achieved in any given part of the integrated operation 200. When a corresponding relevant work flow has been identified, a discussion as denoted by 600 (DSC) can then occur within the group 70 to determine a correct course of action for managing and monitoring the integrated operation 200. Such a conventional approach as denoted by the arrow 650 (BU) is not only stressful for the group 70, but also potentially open to sub-optimal decisions occurring, for example in a similar manner to those which occurred at Chernobyl and Three Mile Island nuclear facilities. The bottom-up approach as denoted by the arrow 650 arises on account of an incremental manner in which proprietary software products are configured together to provide a conventional type of tool for managing the integrated operation 200.

In contradistinction, as denoted by an arrow 660 (TD) in FIG. 7 representing a top-down approach, the inventors have appreciated that it is more efficient to design the environment 400 so that it is more conducive to efficient monitoring and management of the integrated operation 200, for example under generally normal production conditions. The present invention is capable of being implemented by one or more software products executable on computer hardware for providing the aforesaid top-down approach. The top-down approach represented by the arrow 660 in FIG. 7 involves a discussion and subsequent decision within the group of personnel 70 regarding how the integrated operation 200 should be monitored and managed. When an appropriate approach to execute such monitoring and management has been decided, process-steps and a corresponding work-flow are then user-defined a priori to being employed in practice; a work-flow is defined as a temporally implemented sequence of process-steps. The process-steps are optionally user-entered via the aforesaid one or more software products implementing the invention, or are user-selected from a predefined list presented by the one or more software products implementing the invention. From experience and knowledge of the user, for example one or more personnel of the group 70, categories and types of data 630 necessary for supporting the process steps and associated workflow 610 are then defined, for example in an a priori manner. Such categories can represent one or more of:

(a) a selection of a subset of data derived from a given set of data;
(b) an aggregate of a plurality of subsets of data derived from a plurality of corresponding sets of data;
(c) a selection of a given set of data;
(d) an aggregate of a plurality of given sets of data; and
(e) an aggregate of at least a first set of data with at least a subset of data derived from a second set of data.

The sets and subsets of data can be derived from a given software product. Alternatively, the sets and subsets can be generated from a plurality of software products.

When the categories and types of data 630 have been defined, measurements necessary for generating such data are then determined, for example automatically by the one or more software products from information supplied thereto regarding structure of the integrated operation 200.

By adopting such a top-down approach as facilitated by the one or more software products pursuant to the present invention, the group of personnel 70 are able to manage and monitor functioning of the integrated operation 200 in terms of process steps and work-flows without having to consider, on a real-time basis when invoking workflows, what data and associated measurements are required to be accessed; such a manner of operation potentially greatly reduces stress to the group of personnel 70. When there are large number of off-shore platforms 310, or oil and/or gas wells, the group of personnel 70 in the environment 400 are thereby pursuant to the present invention not overwhelmed with information and are therefore optimally capable of monitoring and managing the integrated operation 200 as denoted by the axis 520 (Op) in FIG. 5. By such optimal operation, a risk of equipment accidents and such like can be potentially greatly reduced and output production of oil can be substantially optimized by employing the present invention.

Figure 8:
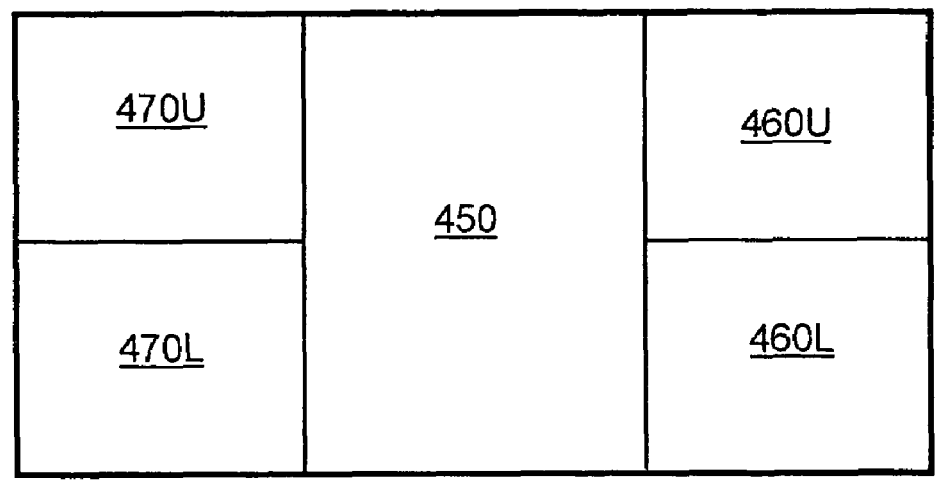
FIG. 8 is a schematic layout of an array of screens employed in generating the environment depicted in FIG. 4.

In the environment 400 illustrated in FIG. 4, a central region of the array of one or more screens 420 as illustrated in FIG. 8 is beneficially used to present a spatial map of the integrated operation 200; for example, the central screen 450 can be used beneficially for such purpose. Optionally, the spatial map is spatially movable amongst the array of screens 420. Such a map is advantageously a three-dimension (3-D) perspective view as will be elucidated in greater detail later. Symbols and/or sub-regions of the perspective view can be highlighted by the one or more personnel 70, for example in a manner of a 3-D portal, to invoke one or more of workflows, operating procedures, measurement data, analysis results and so forth pertaining the highlighted symbols and/or sub-regions. One or more workflows, operating procedures, measurement results, analysis results and so forth can be presented on mutually different screens or screen regions of the array 420. Such workflows, operating procedures, measurement results, analysis results as presented graphically can themselves function as portals to further information and/or data; for example, clicking a mouse and/or cursor on given data results can invoke information regarding sensors employed to derive the data results together with a measurement procedure adopted when using the sensors.

An upper left-hand-side region of the array 420, for example the upper left-hand-side screen 470U, is beneficially employed to present process flow information to the group of personnel 70. Moreover, a lower left-hand-side region of the array 420, for example the lower left-hand-side screen 470L, is beneficially used for presenting data being used by the one or more software products executing on computing hardware to implement the present invention in the environment 400. Furthermore, a lower right-hand-side region of the array 420, for example the lower right-hand-side screen 460L, is optionally employed to present a given selected operating procedure. An upper tight-hand-side region of the array 420, for example the upper right-hand-side screen 460U, is optionally employed for diverse purposes, for example presenting points of a selected agenda to the group of personnel 70. However, it will be appreciated that the screens 450, 460U, 460L, 470U, 470L are susceptible to being user-respecified with regard to information that they present during operation when creating the environment 400. Beneficially, the side screens 460U, 460L, 470U, 470L present information invoked by moving a cursor or similar around graphic symbols and images presented on the central screen 450, for example in a manner of the aforementioned 3-D portal. As elucidated in the foregoing, invoking a given region or screen of the array 420 beneficially invokes corresponding computational results and/or data pertinent thereto in operation without the group of personnel 70 needing to consider in real-time from which data base or files the results and/or data are stored; such details are provided when defining given workflows being invoked.

Figure 9:
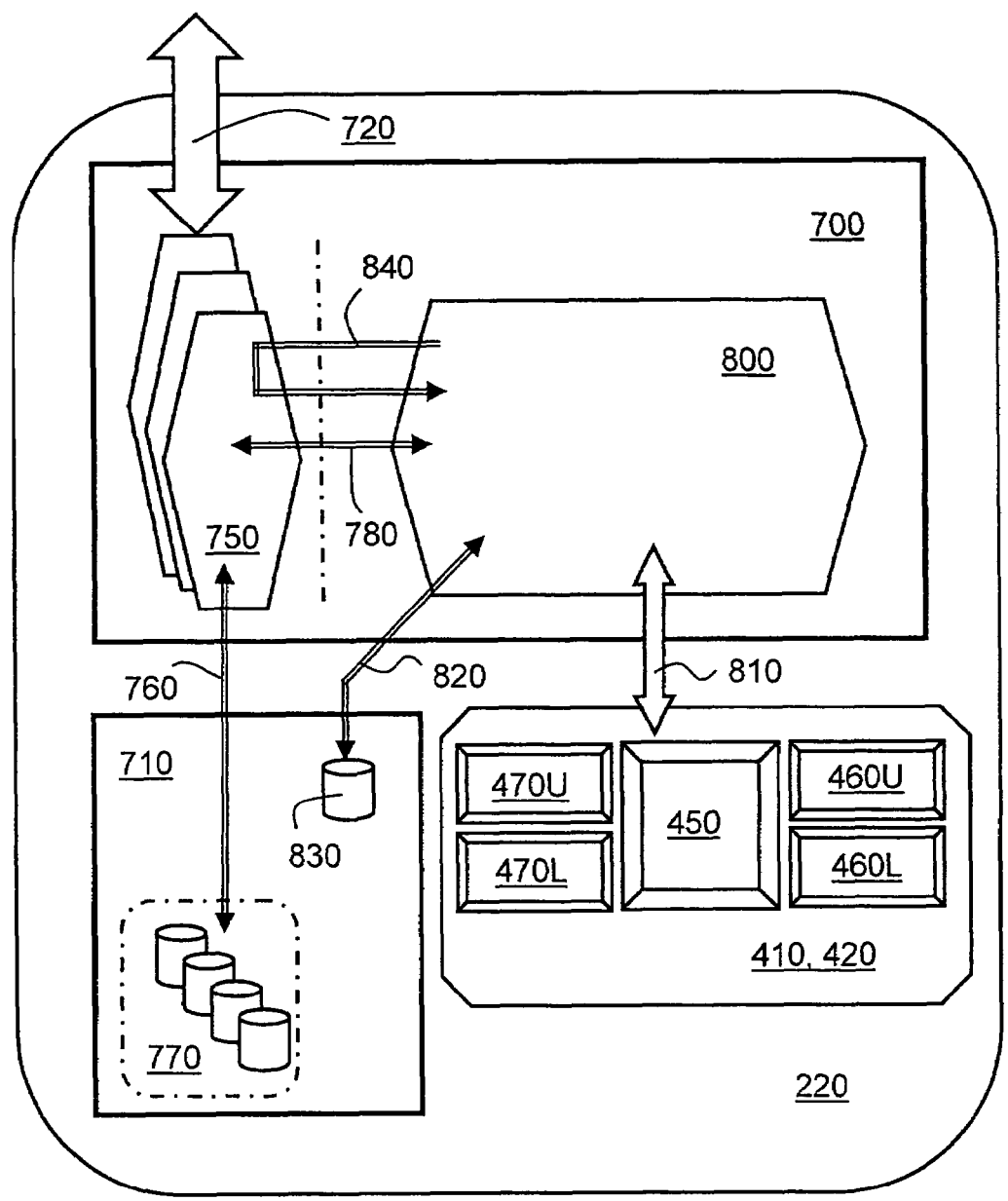
FIG. 9 is an illustration of a configuration of computing hardware and software products employable to implement an embodiment of the present invention, the software products being a combination of earlier known proprietary software products and novel software products pursuant to the present invention.

Examples of implementation of one or more software products executable on computing hardware at the operation centre 220 will now be described with reference to FIG. 9. The operation centre 220 includes the console 410 and the array of screens 420 as described earlier. Moreover, the operation centre 220 includes, or has associated therewith, computing hardware 700 including one or more computers. The computing hardware 700 is coupled, either indirectly or directly, via a data communication link 720 to other parts of the integrated operation 200, for example to the off-shore oil and/or gas platforms 310. Moreover, the computing hardware 700 is also coupled to data storage 710 including databases 770, 830; the databases 770, 830 are physically located at one or more of: locally at the operation centre 220, remote from the operation centre 220. The computing hardware 700 is operable to execute one or more proprietary software products denoted by 750; beneficially, the one or more proprietary software products 750 are existing software which has, prior to implementing the present invention, been used for controlling functioning of the integrated operation 200 in a sub-optimal manner.

The one or more proprietary software products 750 are operable to employ a data link 760 for accessing the databases 770 for storing computational results, logging data, accessing pre-computed information and so forth.

One or more software products denoted by 800 represent an embodiment of the present invention. The one or more software products 800 are configured to be executed on the computing hardware 700 concurrently with the one or more earlier proprietary software products 750 and also to interface therewith via a data link denoted by 780. Moreover, in operation, the one or more software products 800 are operable to access their own special database 830 via a data link 820. Furthermore, the one or more software products 800 are operable to selectively communicate data to the one or more proprietary products 750 for having data processing performed therein, wherein results of such data processing are returned to the one or more software products 800 for subsequent handling therein, for example for storage in the database 830 or for presentation to the group of personnel 70 via the array of one or more screens 420.

The one or more software products 800 are operable to create the environment 400 as depicted in FIG. 4. Moreover, the one or more software products 800 are designed to be beneficially added to the one or more earlier proprietary software products 750 so that introduction of the one or more software products 800 of the invention does not beneficially result in disruption in operation of the integrated operation 200. Such disruption is not only potentially costly, but also potentially dangerous if, for example, safety services for the integrated operation 200 are temporarily disrupted during installation of the one or more software products onto the computing hardware 700. The present invention is susceptible to avoiding occurrence of any such disruption whilst maintaining optimal normal production.

As elucidated in the foregoing, the one or more software products 800 create the environment 400 for enabling the group of personnel 70 to adopt the aforesaid top-down approach to management and/or monitoring of the integrated operation 200 as depicted in FIG. 7. The one or more software products 800 will next be elucidated in greater detail with reference to FIG. 10.

Figure 10:
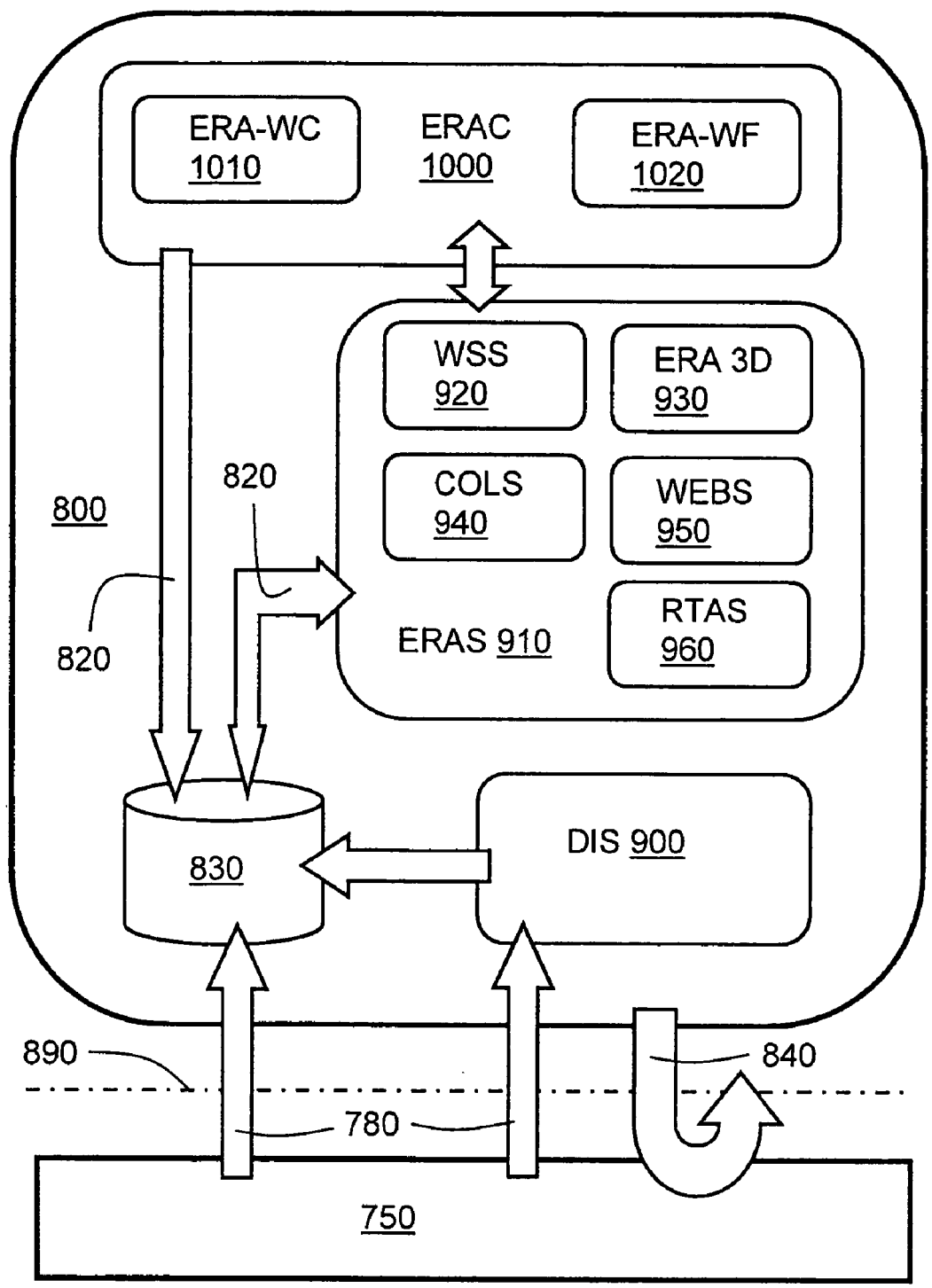
FIG. 10 is an illustration of software products constituting a software suite for implementing the present invention.

The one or more software products 800 are, in one example embodiment of the present invention, configured as shown in FIG. 10. Components in FIG. 10 are defined in Table 2.

TABLE 2 definition of component parts of the one or more software products 800

| Reference number | Mnemonic abbreviation | Definition |
| --- | --- | --- |
| 900 | DIS | Data Integration Service |
| 910 | ERAS | ERA Services |
| 920 | WSS | Work Space Service |
| 930 | ERA 3D | ERA 3D service |
| 940 | COLS | Collaboration Service |
| 950 | WEBS | Web services |
| 960 | RTAS | R-T Analysis Service |
| 1000 | ERAC | ERA Client |
| 1010 | ERA-WC | ERA Workflow Composer |
| 1020 | ERA-WF | ERA Workflow Facilitator |

The database 830 is beneficially referred as being an "ERA database" for supporting the one or more software products 800 which are conveniently referred to as an ERA software suite. The software suite 800 includes an ERA client 1000 which is a software product executable on the computing hardware 700 to facilitate data communication to the array of one or more screens 420, and to the console 410 for receiving keyboard-entered instructions therefrom in operation. The ERA client 1000 includes an ERA Workflow Composer 1010 which is a software product executable on the computing hardware 700 to present the group of personnel 70 with a graphical user interface (GUI), for example on the upper left-hand-side screen 470U, for composing, namely defining and/or entering, a new work flow for use for controlling the integrated operation 200. Moreover, the ERA client 1000 also includes an ERA Workflow Facilitator 1020 which is a software product executable on the computing hardware 700 for accessing a given workflow defined by the group of personnel 70 using the workflow composer 1010 and for implementing the given workflow within the integrated operation 200. The ERA Workflow Facilitator 1020 beneficially provides a mechanism by which event-driven workflows can be invoked at appropriate times. A workflow can be of diverse nature, for example one or more of:

(a) performing maintenance on one or more of the off-shore platforms 310;
(b) installing one or more new items of equipment on one or more of the off-shore platforms 310;
(c) modifying one or more rates of oil and/or gas production on one or more of the aforesaid off-shore platforms 310 for optimally controlling well head pressure;
(d) modifying an operating routine or operating procedure at one or more of the off-shore platforms 310;
(e) performing one or more non-routine special measurements or tests at one or more of the off-shore platforms 310, for example: a series of seismic measurements, a series of bore-hole pressure or flow rate measurements, a chemical analysis of bore-hole substances and so forth;
(f) transporting personnel to and/or from one or more of the off-shore platforms 310;
(g) arranging for oil and/or gas collection from one or more of the off-shore platforms 310;

and so forth.

The ERA client 1000 within the ERA software suite 800 is operable to communicate with one or more ERA services software products 910. The ERA services software products 910 include one or more of: a work space service 920, an ERA 3D service 930, a collaboration service 940, Web services 950, and R-T analysis services 960. The work space service 920 is invoked by the ERA client 1000 when the group of personnel 70 are desirous to view a given workspace, for example a plan view of one of the off-shore platforms 310 to be shown on the central screen 450; the work space service 920 is thus tasked with creating a graphical environment as viewed by group of personnel 70 when viewing the array of one or more screens 420. Invoking a given workspace on the array 420 optionally specifically invokes databases, computed results, measurement data, background information, operating procedures and so forth associated with the given workspace. Moreover, the ERA 3D service 930 is invoked when the ERA client 1000 requires a 3-D image, namely perspective 3-D view in a two-dimensional format, to be generated for presentation to the group of personnel 70, for example a 3-D image of layers of geographical strata lying beneath a given off-shore platform 310 through which a borehole is to be drilled, a perspective map view of a facility to be monitored and/or managed; the ERA 3D service 930 is operable to provide, for example, the aforesaid 3-D portal. The collaboration service 940 is invoked when the group of personnel 70 need to communicate with other groups of personnel when implementing a given workflow, for example communicating with relevant specialist resources 250; for example, in connection with implementing a new borehole drilling operation, specialist knowledgeable geologists need to be contacted to be available on a given off-shore platform 310 whilst drilling of the new borehole is executed in case of complications arising during drilling. The collaboration service 940 is optionally operable to establish a video conference without the group of personnel 70 needing to expend effort during operation in find telephone numbers and such like for the geologists. Moreover, the collaboration service 940 is susceptible to being invoked from a defined step of an a priori submitted workflow.

The Web services 950 are invoked by the ERA client 1000 when implementing a given workflow or invoking a given workspace on the array 420, for example when access is needed to external data communication networks such as remote information databases, web-sites and similar accessible via the Internet. Furthermore, the R-T analysis services 960 are invoked by the ERA client 1000 when specific types of data processing are required when implementing a given workflow selected by the group of personnel 70 in operation; such data processing is potentially invoked when a given workflow and/or workspace is selected by the group of personnel 70, for example when the workflow requires graphical analytical results to be presented to the group of personnel 70.

The ERA client 1000 is preferably written, at least in part, in contemporary computer languages such as contemporary C++ and C#.

It will be appreciated that the ERA client 1000 is capable of supporting execution of several workflows concurrently. Moreover, the ERA client 1000 enables progress on each of the concurrently executing workflows to be monitored and managed, for example in a mutually independent manner. Furthermore, a given workflow executing via the ERA client 1000 is susceptible to invoking several of the services 920, 930, 940, 950, 960 concurrently; for example, seismic measurements executed in a data acquisition stage of a given workflow need in a subsequent step of the workflow to be processed by the R-T analysis service 960 and analysis results generated thereby processed into 3-dimensional graphical format using the ERA 3D service 930 for generation of an image for presentation on the array of screens 420. Certain of the services 920, 930, 940, 950, 960 potentially require access to data processing provided by the one or more earlier proprietary software products 750 for performing various computational tasks, for example data analysis and statistical computation, provided by way of the aforesaid link 840.

Optionally, the workflows entered into the ERA client 1000 can be hierarchical in nature, namely certain workflows being subordinate parts of other higher-order workflows. The subordinate workflows are beneficially invoked via execution of higher-order workflows. Alternatively, workflows can be defined in a top-down in isolation of other workflows for the integrated operation 200. Optionally, execution of certain workflows can be automatically initiated by the ERA software suite 800 in response to certain physical conditions, for example excess well oil and/or gas pressure or excess oil flow conditions, occurring with the integrated operation 200; such automatic initiation is conveniently referred to as being event-driven initiation of workflows. In such situations, the ERA software suite 800 is operable to automatically visually and/or aurally highlight, namely "flag up", to the group of personnel 70 the workflows which have been conditionally automatically invoked. Alternatively, or additionally, certain workflows can be automatically terminated by the ERA software suite 800 in an event that physical conditions causing the workflows to be invoked are no longer prevalent, for example reduction in oil-well pressure or certain equipment unexpectedly coming back into function.

The database 830 associated with the software suite 800 is of special benefit in that operation of the one or more earlier software products 750 is not interrupted or compromised by way of installation and subsequent operation of the ERA software suite 800; the ERA software suite 800 is thereby potentially capable of being installed in a substantially seamless manner. Moreover, for rapid presentation of information on the array of one or more screens 420, the ERA software suite 800 is operable to access data rapidly from the database 830 which is beneficially not accessed by the one or more earlier proprietary software products 750. Such an arrangement renders the ERA software suite 800 prompt and responsive to instructions and requests entered by the group of personnel 70 at the console 410. Such prompt presentation potentially reduces working stress for the group of personnel 70.

It will be appreciated that the ERA software suite 800 is not only susceptible to being used as described by way of example for the integrated operation 200, but is also susceptible of being used to control other types of complex system as elucidated in the foregoing, for example wind turbine energy farms, solar array panel systems and so forth. For example, although use of the ERA software suite 800 in the operation centre 220 is described, the software suite 800 is susceptible to being alternatively, or additionally, employed at one or more of the platforms 310. The software suite 800 is thus susceptible to being used at a plurality of spatial locations in a hierarchical manner within the integrated operation 200. Yet more optionally, the ERA software suite 800 when employed a plurality of times in a complex system can be operable to define its own hierarchy in a manner of a peer-to-peer network by mutual communication between the plurality of co-executing software suites 800.

Such versatile adaptation of the ERA software suite 800 is possible by way of a data integration service software product 900 forming a part of the ERA software suite 800, wherein definitions are submitted for data exchange between the one or more earlier proprietary software products 750 and the ERA software suite 800. Optionally, the data integration service software 900 can be automatically self-adjusting to accommodate introduction of new support software into the operation centre 220 and/or at one or more of the platforms 310. When adapting the ERA software suite 800 to a given task, for example for managing a specific type of integrated operation, definitions of interfaces are entered, for example by skilled computing personnel, via the data integration service 900. In an event of the one or more proprietary software products 750 being later upgraded with additional software products, the data integration service 900 can be optionally invoked so that an additional definition can be input so that the ERA software suite 800 is operable to access such additional software products.

The data integration service 900 is susceptible to receiving configuration instructions or configuration data entered in a high-level control language, for example via Java, Javascript or similar. Use of such high-level language enables the data integration service 900 to be applied to adapt the software suite 800 to diverse applications as elucidated in the foregoing by using instruction code which is readily intelligible to computing personnel.

When a given step of workflow is entered via the ERA workflow composer 1010 which needs access to measurements and/or earlier measurement data stored in the one or more databases 770, the given step, for example, will define that it requires a given service 910 to be invoked, for example the R-T analysis service 960. The R-T analysis service 960 has access to certain processing facilities in one or more of the software products 750 which it achieves via the link 840, the link 840 also being defined via the aforesaid data integration services 900. Moreover, the data integration services 900 are also used to define which data is to be copied from the one or more databases 770 and stored in the database 830 for rapid access by the R-T analysis service 960; in this respect, the data integration services 900 are operable to establish a selective data filter. By employing such an approach, the ERA software suite 800 is rendered highly responsive to the group of personnel 70 and capable of promptly presenting them with relevant information indicative of conditions within the integrated operation 200, for example in response to the group 70 invoking a given workflow for consideration. Use of the ERA software suite 800 is potentially capable of ensuring substantially optimal performance in normal operating conditions. Moreover, the ERA software suite 800 can, for example, be optionally used to avert undesirable technical incidents from occurring when managing and monitoring complex systems, for example incidents such as occurred at Chernobyl and Three Mile Island nuclear plants.

A manner of presentation provided by the software suite 800 on the central screen 450 is also beneficially arranged to reduce stress experienced by the group of personnel 70. For example, the central screen 450 is beneficially employed, as elucidated in the foregoing, to present spatial map information in perspective format. Optionally, the spatial map is relocatable amongst the array of screens 420, for example under mouse-based or curser-based or similar screen control. Colored regions and/or symbols are beneficially overlaid by the ERA client software products 1000 onto geographical regions of the map information, for example an increased well pressure at a given off-shore platform 310 needing attention via a workflow defined for high-production conditions. For example, it is normal that in a range of 1% to 5% of the oil and/or gas platforms 310 are responsible for in a range of 20% to 40% of total oil and/or gas production from the integrated operation 200; attention to optimize production from highly productive platforms 310 is of great importance. However, it will be appreciated that the integrated operation 200 is a dynamically changing system such that certain oil and/or gas platforms 310 whose oil and/or gas production was initially low can later become highly productive and vice versa. Complex conditions can potentially arise in operation, for example boreholes can become blocked due to decomposition and/or deposition of gas hydrates therein.

Such colored regions and/or overlaid symbols are beneficially used to indicate safety zones, for example 150 metre radius safety zones, around one or more facilities, for example off-shore platforms 310, whereat an incident has occurred such as highly enhanced oil and/or gas well pressure. Alternatively, such colored regions and/or symbols can be used to present information to the group of personnel 70 indicative of current yield of oil being obtained from the off-shore platforms 310, or indicative of energy being generated by wind turbines comprising a wind farm for example, or power flows occurring at various locations in an electricity distribution network and so forth.

The aforesaid collaboration services software product 940 is also susceptible to enabling one or more region of array of one or more screens 420, for example one or more of the screens 450, 460U, 460L, 470U, 470L, to be operable to support video conferencing, for example when the group of personnel 70 need to be in rapid communication with specialist resources 250 in an event of a high-production situation arising. In dealing with the high-production situation, a workflow defined via the ERA client software products 800 has as one of its steps to invoke a video conference with the specialist resources 250 and will establish such a conference, for example by pre-calling the specialist resources 250 to warn them of occurrence of the video conference as well as establishing data communication links from the operation centre to the specialist resources 250 at an appropriate time. Such operation of the ERA software products 800 is capable of greatly reducing personnel stress in the environment 400, thereby providing for more efficient operation and/or reduced risk of accidents or similar incidents occurring.

In the foregoing, a "work flow" is beneficially defined as comprising a series of steps to be executed in a defined temporal sequence. Moreover, the steps can be diverse in nature relating to processing activities necessary to support the environment 400 as well as activities to be executed in various parts of the integrated operation 200. For example, an example workflow relating to installation of an item of equipment on a given off-shore oil and/or gas platform 310 can involve workflow steps of:

(a) automatically flagging up at an appropriate instance of time $t_0$ within the environment 400 when installation of the equipment is required on the given oil and/or gas platform 310;

(b) presenting to the group of personnel 70 corresponding operating procedures which need to be taken into consideration when installing the equipment;

(c) automatically arranging a video conference with specialist resources 250 responsible for installing the equipment;

(d) retrieving information, for example operating procedures, from the database 830 pertinent to installation of the equipment and presenting the information to the group of personnel 70 and/or to the specialist resources 250;

(e) sending a specification of the equipment to the vendor offices 230 for procurement;

(f) subsequently selectively collating measurements from monitoring sensors at the given oil and/or gas platform 310, for example cameras located at various spatial locations, and filtering the measurements to generate corresponding monitoring data during installation of the given equipment on the given oil and/or gas platform 310 and storing the monitoring data in the database 830;

(g) accessing the database 830 to extract the monitoring data to automatically report back at defined intervals to the group of personnel 70 and/or to the specialist resources 250 regarding progress of installation of the equipment;

(h) when the equipment has been brought into operation at the given oil and/or gas platform 310, collating operating measurements from sensors associated with the equipment, selectively filtering the operating measurements for generating operating data, storing the operating data in the database 830, and subsequently accessing the database 830 at a time instance $t_1$ defined in the workflow, to present operating results derived from the operating data to the group of personnel 70; and (i) optionally invoking a subordinate workflow for initiating a maintenance or trouble-shooting process in an event that the equipment installed on the oil and/or gas platform 310 is not performing according to defined specifications.

The example workflow is submitted in a top-down manner using the ERA software suite 800 prior to procurement of the given equipment. The example workflow defined in steps (a) to (i) includes a diverse range of steps to be executed in temporal sequence wherein information presented to the group of personnel 70 is defined a priori in a workflow devised in a top-down manner.

It will be appreciated that workflows submitted to the ERA software suite 800 can have one or more operating procedures associated therewith. Optionally, the operating procedures are stored on the database 830. Moreover, specific types of data relevant to the workflows are also susceptible to being defined by the group of personnel 70. In consequence, the given workflows are presented on the array of one or more screens 420, their corresponding procedures and associated relevant data are optionally simultaneously presented. A graphical representation of the data can optionally be overlaid onto the spatial representation as provided in operation on the central screen 450. One or more workflows can be optionally simultaneously presented on the array of screens 420, together with a mutual relationship between the workflows, for example their hierarchical dependence and/or their relationship to various potentially relevant procedures.

The present invention is not limited to being applied solely in respect of the integrated operation 200 as elucidated in the foregoing, namely a complex configuration of off-shore oil and/or gas platforms 310. It is, for example, potentially susceptible to being adapted for one or more of the following:

(a) a configuration of oil and/or gas wells;
(b) a configuration of off-shore oil and/or gas platforms;
(c) a configuration of wind turbines operable to generate electricity;
(d) a configuration of solar cells for operable to generate electricity;
(e) a nuclear electrical power generating installation;
(f) an electricity distribution network;
(g) a configuration of marine wave energy units operable to generate electricity from marine wave motion;
(i) a configuration of dams and/or sluices;
(j) a convention fossil-fuel burning electricity generating facility;
(k) a configuration of coal mines for mining coal;
(l) a configuration of geothermal sites for collecting geothermal energy; and
(m) a logistics configuration for distributing goods;
(n) a water distribution network;

although not limited thereto.

It will be appreciated that the ERA software suite 800 as described in the foregoing is capable of being furnished with additional facilities without departing from the scope of the invention as defined by the appended claims. Thus, modification to embodiments of the invention described in the forgoing is feasible without departing from the scope of the invention as defined by the appended claims.

Optionally, the array of one or more screens 420 can be implemented as a single expansive screen, for example an expansive projection screen, with sub-areas spatially allocated to present information substantially in a manner as described for the screens 450, 460U, 460L, 470U, 470L and variants therefore as elucidated in the foregoing. Optionally, work-spaces presented on the array of one or more screens 420 can be flexibly moved around in relative juxtaposition in response to preferences of the group of personnel 70, for example by way of one or more mouse devices or cursor devices at the console 410.

The ERA software suite 800 is beneficially operated on a Linux, Microsoft or similar highly stable computer platform forming a part of the one or more proprietary software products 750.

Expressions such as "comprise", "include", "contain", "incorporate", "is", "have" and similar are intended to be construed in a non-exclusive manner, namely allowing for other items or components which are not explicitly defined to be present. Reference to the singular shall also be construed to refer to the plural.

Numerals included within parentheses within the appended claims are intended to assist understanding of claimed subject matter and are not intended to determine scope of the claims.

We claim:

1. A data handling system (700, 710) for managing and/or monitoring a complex system (200, 250, 310), said data handling system (700, 710) comprising computing hardware (700) operable to execute one or more support software products (750) for assimilating data and/or information from the complex system (250, 310) and for sending information and/or data thereto for monitoring and/or managing said complex system (250, 310), characterized in that:

said data handling system (700, 710) is further provided with one or more interface software products (800) executable on said computing hardware (700) for providing in operation a data and/or information interface (400, 420) between one or more personnel (70) and said one or more support software products (750), directly to said complex system (250, 310); and said one or more interface software products (800) being operable to implement one or more workflows defined in a top-down strategy, said one or more workflows defining one or more data filters for selectively filtering and/or aggregating information and/or data provided from said complex system (250, 310) and/or from said one or more support software products (750) for presenting to said one or more personnel (70) via said one or more interface software products (800) for selectively reducing a quantity of data and/or information to be interpreted by said one or more personnel (70).

2. A data handling system (700, 710) as claimed in claim 1, wherein said one or more interface software products (800) are provided when executing on said computing hardware (700) with access to at least one dedicated database (830), said at least one dedicated database (830) being used by said one or more interface software products (800) to store data supplied by said one or more support software products (750) subject to data filtering and/or aggregating as defined by said one or more workflows.

3. A data handling system (700, 710) as claimed in claim 1, wherein said one or more interface software products (800) are operable to communicate presentation data to an array of one or more screens (420) viewable by said one or more personnel (70) in operation, said presentation data being derived from at least one of:

(a) intermediate data and/or information computed by said one or more support data products (750) from measurement data provided from said complex system (250, 310);
(b) measurement data supplied directly from the complex system (250, 310) to the one or more interface software products (800); and
(c) selectively-filtered and/or selectively-aggregated stored data which has been generated by said one or more interface software products (800) in operation from data provided from said one or more supportive data products (750) and/or directly from said complex system (250, 310).

4. A data handling system (700, 710) as claimed in claim 3, wherein said array of one or more screens (420) includes a plurality of screens (450, 460U, 460L, 470U, 470L) and/or display regions comprising:

(a) a first screen (450) or first display region for presenting a spatial representation of the complex system (250, 310);
(b) a second screen (470U) or second display region for presenting one or more workflows facilitated by said one or more interface software products (800);
(c) a third screen (470L) or third display region for presenting filtered data which is pertinent to said one or more workflows facilitated by said one or more interface software products (800); and
(d) a fourth screen (460L) or display region for presenting a one or more operating procedures relevant to said one or more workflows presented on said second screen (470U).

5. A data handling system (700, 710) as claimed in claim 4, wherein said first screen (450) or display region is spatially located centrally relative to said second, third and fourth screens or display regions.

6. A data handling system (700, 710) as claimed in claim 1, wherein said one or more interface software products (800) when executed on said computing hardware (700) are operable to enable said one or more personnel (70) to define one or more workflows in a top-down strategy, said one or more workflows defining one or more filter parameters for use in filtering and/or aggregating data and/or information to be presented to said one or more personnel (70) in operation.

7. A data handling system (700, 710) as claimed in claim 1, wherein said one or more interface software products (800) are operable when executed on said computing hardware (700) to render said one or more workflows to be invoked in response to at least one of:
(a) one or more invoking instructions generated from one or more other workflows;
(b) one or more physical conditions arising within said complex system (250, 310); and
(c) one or more instructions entered by said one or more personnel (70) to said computer hardware (700) via said one or more interfacing software products (800).

8. A data handling system (700, 710) as claimed in claim 1, wherein said one or more interface software products (800) are operable to enable said one or more workflows to be configured in a mutually-dependent hierarchical manner.

9. A data handling system (700, 710) as claimed in claim 1, wherein said one or more interface software products (800) are operable to enable said one or more workflows to be configured to be executed in a mutually concurrent manner.

10. A data handling system (700, 710) as claimed in claim 1, wherein said one or more interface software products (800) include a data integration service software product (900) for defining a data interface between said one or more interface software products (800) and said one or more support software products (750), said one or more data interface software products (800) being operable to function as a data filter and/or data aggregator for reducing a volume of data to be presented to said one or more personnel (70) in connection with one or more associated workflows being presented thereto.

11. A data handling system (700, 710) as claimed in claim 10, wherein said data integration service software product (900) is operable to being edited to adapt said one or more interface software products (800) for operating with a variety of types of said complex system.

12. A data handling system (700, 710) as claimed in claim 11, wherein said one or more interface software products (800) are configurable for being used to monitor and/or manage said complex system (200, 250, 310) when said complex system is implemented as at least one of:
(a) a configuration of oil and/or gas wells;
(b) a configuration of off-shore oil and/or gas platforms;
(c) a configuration of wind turbines operable to generate electricity;
(d) a configuration of solar cells operable to generate electricity;
(e) a nuclear electrical power generating installation;
(f) an electricity distribution network;
(g) a configuration of marine wave energy units operable to generate electricity from marine wave motion;
(i) a configuration of dams and/or sluices;
(j) a convention fossil-fuel burning electricity generating facility;
(k) a configuration of coal mines for mining coal;
(l) a configuration of geothermal sites for collecting geothermal energy;
(m) a logistics configuration for distributing goods; and
(n) a water distribution network.

13. A software product (800) stored or communicated via a computer readable medium, said software product (800) being executable on computing hardware (700) for implementing a data handling system (700, 710) as claimed in claim 1.

14. A method of handling data in a data handling system (700, 710) for monitoring and/or managing a complex system (200, 250, 310), said data handling system (700, 710) comprising computing hardware (700) operable to execute one or more support software products (750) for assimilating information and/or data from the complex system (250, 310) and for sending control information thereto for monitoring and/or managing said complex system (250, 310), characterized in that said method includes steps of:
(a) installing into said data handling system (700, 710) one or more interface software products (800) executable on said computing hardware (700) for providing in operation a data interface (400, 420) between one or more personnel (70) and said one or more support software products (750), directly to said complex system (250, 310); and
(b) applying said one or more interface software products (800) to implement one or more workflows defined in a top-down strategy, said one or more workflows defining one or more filters and/or aggregators for selectively filtering and/or aggregating information and/or data provided from said complex system (250, 310) and/or from said one or more support software products (750) for presenting to said one or more personnel (70) via said one or more interface software products (800) for selectively reducing a quantity of data to be interpreted by said one or more personnel (70).

15. A method as claimed in claim 14, said method including a step of:
(c) providing said one or more interface software products (800) when executing on said computing hardware (700) with access to one or more dedicated databases (830), said one or more dedicated databases (830) being used by said one or more interface software products (800) to store data supplied by said one or more support software products (750) subject to data and/or information filtering and/or aggregating as defined by said one or more workflows.

16. A method as claimed in claim 15, said method including a further step of:
(d) communicating via said one or more interface software products (800) presentation data to an array of one or more screens (420) viewable by said one or more personnel (70) in operation, said presentation data being derived from at least one of:
intermediate data computed by said one or more support data products (750) from measurement data provided from said complex system (250, 310);
measurement data supplied directly from the complex system (250, 310) to the one or more interface software products (800); and
selectively-filtered and/or selectively-aggregating stored data which has been generated by said one or more interface software products (800) in operation from data and/or information provided from said one or more supportive data products (750) and/or directly from said complex system (250, 310).

17. A method as claimed in claim 16, wherein said array of one or more screens (420) includes a plurality of screens (450, 460U, 460L, 470U, 470L) and/or a plurality of screen regions comprising:

(a) a first screen (450) or first screen region for presenting a spatial representation of the complex system (250, 310);

(b) a second screen (470U) or second screen region for presenting one or more workflows facilitated by said one or more interface software products (800);

(c) a third screen (470L) or third screen region for presenting filtered data which is pertinent to said one or more workflows facilitated by said one or more interface software products (800);

(d) a fourth screen (460L) or fourth screen region for presenting a one or more operating procedures relevant to said one or more workflows presented on said second screen (470U) or second screen region.

18. A method as claimed in claim 17, wherein said first screen (450) or first screen region is spatially located centrally relative to said second, third and fourth screens or screen regions.

19. A method as claimed in claim 14, said method including a step of:

(e) enabling said one or more interface software products (800) when executed on said computing hardware (700) for said one or more personnel (70) to define one or more workflows in a top-down strategy, said one or more workflows defining one or more filter parameters and/or aggregating parameters for use in filtering and/or aggregating data and/or information to be presented to said one or more personnel (70) in operation.

20. A method as claimed in claim 14, said method including a step of:

(f) configuring said one or more interface software products (800) to be operable to render said one or more workflows to be invoked in response to at least one of:

one or more invoking instructions generated from one or more other workflows;

one or more physical conditions arising within said complex system (250, 310); and one or more instructions entered by said one or more personnel (70) to said computer hardware (700) via said one or more interfacing software products (800).

21. A method as claimed in claim 14, said method including a step of:

(g) arranging said one or more interface software products (800) to be operable to enable said one or more workflows to be configured in a mutually-dependent hierarchical manner.

22. A method as claimed in claim 14, said method including a step of:

(h) arranging said one or more interface software products (800) to be operable to enable said one or more workflows to be configured to be executed in a mutually concurrent manner.

23. A method as claimed in claim 14, wherein said one or more interface software products (800) include a data integration service software product (900) for defining a data interface between said one or more interface software products (800) and said one or more support software products (750), said data interface software product being operable to function as a data filter and/or data aggregator for reducing a volume of data to be presented to said one or more personnel (70) in connection with one or more associated workflows being presented thereto.

24. A method as claimed in claim 23, wherein said data integration service software product (900) is operable to being edited to adapt said one or more interface software products (800) for operating with a variety of types of said complex system.

25. A method as claimed in claim 24, wherein said one or more interface software products (800) are configurable for being used to monitor and/or control said complex system (200, 250, 310) when said complex system is implemented as at least one of:

(a) a configuration of oil and/or gas wells;
(b) a configuration of off-shore oil and/or gas platforms;
(c) a configuration of wind turbines operable to generate electricity;
(d) a configuration of solar cells for operable to generate electricity;
(e) a nuclear electrical power generating installation;
(f) an electricity distribution network;
(g) a configuration of marine wave energy units operable to generate electricity from marine wave motion;
(i) a configuration of dams and/or sluices;
(j) a convention fossil-fuel burning electricity generating facility;
(k) a configuration of coal mines for mining coal;
(l) a configuration of geothermal sites for collecting geothermal energy;
(m) a logistics configuration for distributing goods; and
(n) a water distribution network.

\* \* \* \* \*